UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

PAINT AND VARNISH REMOVER.

No. 904,250.  Specification of Letters Patent.  Patented Nov. 17, 1908.

Application filed August 6, 1907. Serial No. 387,274.

*To all whom it may concern:*

Be it known that I, CARLETON ELLIS, a citizen of the United States, residing at Larchmont, Westchester county, New York, have invented a new and useful Improvement in Paint and Varnish Removers, of which the following is a specification.

My invention relates to that class of paint and varnish removers comprising a mixture of volatile solvents designed to bring the paint and varnish partially or wholly into solution and a thickening agent for the purpose of preventing the evaporation of the volatile solvents while they are acting on the surface from which the coating is to be removed.

More particularly it relates to those removers in which one or more of the solvents is a solvent of the material used to thicken the composition while one or more of the other solvents therein do not dissolve the thickener but are nevertheless soluble in the other volatile solvents used in the composition. In the making of a composition of this character the thickening material, or the substance from which the thickening material is subsequently to be derived, is first dissolved in those components which are solvents of it, then the other paint and varnish solvents which do not dissolve the thickener and which are consequently eliminants or precipitants thereof are added. This results in producing a supersaturated solution of the thickener. That is to say, some of the latter is thrown out into the liquid undissolved and disseminated throughout the body thereof in a very finely divided state. This suspended matter is so very finely divided and the physical phenomena present under these circumstances are such that the material thrown out of solution will remain suspended for an almost indefinite period of time.

My invention may be embodied in any one of several different forms, in each one of which a great many changes might be made in the minor details and in the substitution of equivalents, etc., without departing from the fundamental principles of my discovery. In all of these modifications, however, I make use of the properties of sulfur or its compounds as thickeners for retarding the evaporation of the volatile solvents.

In the preferred form of my invention I mix sulfur chlorid, that is to say the compound $S_2Cl_2$, with carbon disulfid or an equivalent thereof in which it readily dissolves and then add a sulfur eliminant such as alcohol which decomposes the sulfur compound throwing out a quantity of free sulfur. This goes partly into solution and remains partly suspended in the liquid in a very finely divided condition. The sulfur compound is added in excess to take advantage of the fact that sulfur chlorid is decomposed by the moisture in the air and probably even by dry air to produce free sulfur. So that when the remover has been applied to the surface being treated the atmosphere acts upon the undecomposed portion of the chlorid throwing out a further quantity of free sulfur, which in this case remains entirely in suspension as the mixture of solvents in the composition is already saturated by the sulfur previously separated from the sulfur chlorid.

The details of my preferred modification are as follows: I make a solution of

Carbon disulfid _____ 75 parts
Benzol _____ 25 "
Sulfur chlorid _____ 10 "

and then add thereto wood alcohol 15 to 25 parts.

The sulfur eliminant, which in this case is wood alcohol, reacts upon the sulfur chlorid breaking it up into free sulfur, some oxidation products of sulfur such as thiosulfuric acid, tetrathionic acid, etc., and is itself changed to a chlorin substitution product. A portion of the free sulfur is dissolved by the mixed solvents until they are saturated, and the undissolved remainder stays suspended in the body of the liquid imparting to it a thick consistency. When the composition comes in contact with the atmosphere, as when it is applied to a surface from which the paint or varnish is to be removed, the moisture present therein reacts upon the excess of sulfur chlorid decomposing it with the formation of free sulfur, and sulfurous, thiosulfuric and hydrochloric acids. The separated free sulfur operates to produce a superficial scum or film on the surface of the liquid forming thus an added protection from evaporation. It is probable that the oxygen of the air even when dry also effects to some extent a decomposition of the sulfur chlorid separating out free sulfur.

The second modification of my invention consists in making a solution of

| | |
|---|---|
| Carbon disulfid | 75 parts |
| Benzol | 25 " |
| Sulfur | 10 " | then adding and emulsifying wood alcohol 15 parts.

The alcohol here again, acts as a sulfur eliminant throwing a part of the latter out of its solution in the carbon disulfid, benzol, etc. This free sulfur remains in suspension and operates to retard the evaporation of the volatile solvents when exposed to the atmosphere.

A third modification consists in making a solution of

| | |
|---|---|
| Carbon disulfid | 75 parts |
| Benzol | 25 " |
| Sulfurized linseed oil | 10 " | and then adding wood alcohol 15 parts.

In the place of the vulcanized linseed oil which might be made by the action of sulfur or sulfur chlorid upon linseed oil under the proper conditions, I might use any other drying or semi-drying oil that has been submitted to the sulfurization process. The operation of this modification is similar to that of the second modification. The presence of the vulcanized oil gives the remover a thick jelly-like consistency, adapting it for efficient use on walls and ceilings.

In making the above removers I do not confine myself to the use of the solvents above mentioned but consider that I may make many substitutions therefor without departing from the essence of my invention. Instead of benzol, or a part thereof, I might use any one or more of the following solvents: the benzol homologues, as toluol, xylol, etc., the volatile petroleum hydrocarbons, such as benzin, gasolene, etc., carbon tetrachlorid, sulfuric ether, the aldehydes, ethyl acetate, turpentine, anilin and rosin spirit. Instead of wood alcohol or a part thereof one or more of the following solvents might be used: other alcohols such as ethyl alcohol, denatured alcohol, amyl alcohol, fusel oil and the ketones, among which acetone might be mentioned.

What I claim and desire to cover by Letters Patent is:

1. A composition for removing paint or varnish comprising a super-saturated solution of sulfur in a plurality of different sulfur solvents one of which is a free halogen compound of sulfur and a finish solvent sulfur eliminant miscible with said solvents.

2. A composition for removing paint or varnish comprising a volatile solvent and a solution of sulfur in a sulfur solvent capable of being chemically changed by exposure to produce an evaporation retarder for the volatile solvent.

3. A composition for removing paint or varnish comprising a mixture of volatile solvents and an evaporation retarder containing uncombined sulfur.

4. A composition for removing paint or varnish comprising a supersaturated solution of sulfur in a sulfur solvent and a sulfur eliminant miscible with said solvent.

5. A composition for removing paint or varnish comprising a supersaturated solvent of sulfur in a plurality of different sulfur solvents and a sulfur eliminant miscible with said solvents.

6. A composition for removing paint or varnish comprising a supersaturated solution of sulfur in a plurality of different sulfur solvents one of which is free sulfur chlorid and a sulfur eliminant miscible with said solvents.

7. A composition for removing paint or varnish comprising a supersaturated solution of sulfur in carbon disulfid, sulfur chlorid and a sulfur eliminant miscible with said solvents.

8. A composition for removing paint or varnish comprising a supersaturated solution of sulfur in carbon disulfid, sulfur chlorid, benzol and a sulfur eliminant miscible with said solvents.

In testimony whereof I have signed my name in the presence of two subscribing witnesses.

CARLETON ELLIS.

Witnesses:
SAMUEL R. BELL,
HARRY W. BROWN.